US011279415B2

(12) United States Patent
Muramatsu et al.

(10) Patent No.: US 11,279,415 B2
(45) Date of Patent: Mar. 22, 2022

(54) VEHICLE BODY STRUCTURE

(71) Applicant: HONDA MOTOR CO., LTD., Tokyo (JP)

(72) Inventors: Yuki Muramatsu, Wako (JP); Hiroki Chiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 16/623,426

(22) PCT Filed: Jul. 6, 2017

(86) PCT No.: PCT/JP2017/024751
§ 371 (c)(1),
(2) Date: Dec. 17, 2019

(87) PCT Pub. No.: WO2019/008717
PCT Pub. Date: Jan. 10, 2019

(65) Prior Publication Data
US 2020/0122780 A1   Apr. 23, 2020

(51) Int. Cl.
*B62D 25/16* (2006.01)
*B62D 21/11* (2006.01)
*B62D 25/08* (2006.01)

(52) U.S. Cl.
CPC .............. *B62D 25/16* (2013.01); *B62D 21/11* (2013.01); *B62D 25/087* (2013.01); *B62D 25/088* (2013.01)

(58) Field of Classification Search
CPC ...... B62D 21/11; B62D 25/16; B62D 25/087; B62D 25/088
See application file for complete search history.

(56) References Cited

U.S. PATENT DOCUMENTS

2009/0230665 A1\* 9/2009 Tamura ................ B62D 25/088
280/785
2011/0043001 A1   2/2011 Kim
(Continued)

FOREIGN PATENT DOCUMENTS

CN   104602993   5/2015
CN   105745141   7/2016
(Continued)

OTHER PUBLICATIONS

Yoshikazu Nishimura, Vehicle Body Side Structure of Automobile, Nov. 27, 2008, EPO, JP 2008-284936 A, Machine Translation of Description (Year: 2008).\*
(Continued)

*Primary Examiner* — James A English
(74) *Attorney, Agent, or Firm* — Amin, Turocy & Watson, LLP

(57) ABSTRACT

A vehicle body structure includes a rear bulkhead, a wheel house inner, and a damper-mounting portion. The rear bulkhead includes a left first side closed cross section portion and a left upper closed cross section portion. The left first side closed cross section portion forms a closed cross section which extends along the wheel house inner in a vertical direction. The left upper closed cross section portion forms a closed cross section which extends in a vehicle width direction above the left first side closed cross section portion. The left first side closed cross section portion includes at least one of a fending portion of which a closed cross-sectional area is reduced compared to another region and a fending portion of which a closed cross-sectional area is zero between the left first side closed cross section portion and the left upper closed cross section portion.

12 Claims, 9 Drawing Sheets

(56) References Cited

U.S. PATENT DOCUMENTS

| | | | | |
|---|---|---|---|---|
| 2011/0156447 A1* | 6/2011 | Matsuoka | ............ | B62D 25/088 |
| | | | | 296/203.04 |
| 2014/0028058 A1 | 1/2014 | Mochizuki et al. | | |
| 2017/0174264 A1* | 6/2017 | Maruyama | ............. | B62D 25/16 |
| 2018/0297642 A1* | 10/2018 | Kudoh | ................. | B62D 25/087 |

FOREIGN PATENT DOCUMENTS

| | | |
|---|---|---|
| CN | 106467143 | 3/2017 |
| DE | 102013012614 | 1/2014 |
| JP | 2006-168434 | 6/2006 |
| JP | 2008-284936 | 11/2008 |
| JP | 2010-247628 | 11/2010 |
| JP | 5238305 | 7/2013 |
| JP | 2016-132334 | 7/2016 |
| WO | 2016/199499 | 12/2016 |

OTHER PUBLICATIONS

Kubo et al., Automobile Rear Body Structure, Jul. 25, 2016, EPO, JP2016-132334 A, Machine Translation of Description (Year: 2016).*
Maejima et al., Vehicle Rear Part Structure, Nov. 4, 2010, EPO, JP 2010-247628 A, Machine Translation of Description (Year: 2010).*
International Search Report and Written Opinion for International Application Serial No. PCT/JP2017/024751 dated Oct. 3, 2017, 9 pages.
Chinese Office Action for Chinese Patent Application No. 201780092494.2 dated Aug. 4, 2021.

* cited by examiner

VEHICLE BODY STRUCTURE

TECHNICAL FIELD

The present invention relates to a vehicle body structure.

BACKGROUND

Among vehicle body structures, a structure in which a floor cross member is formed in a closed cross section on a floor and an upper cross member is formed in a closed cross section on a rear parcel has been disclosed. Furthermore, the closed cross sections of both the floor cross member and the upper cross member are connected by a reinforcing member (refer to, for example, Patent Document 1).

In addition, among vehicle body structures, a vehicle body structure in which an upper cross member is formed in a closed section and a rear bulkhead gusset is formed in a closed section has been disclosed. Moreover, the closed cross sections of both the upper cross member and the rear bulkhead gusset are connected, and a damper-mounting portion of a suspension is provided at an end portion of the upper cross member (refer to, for example, Patent Document 2).

RELATED ART DOCUMENTS

Patent Documents

[Patent Document 1]
    Japanese Unexamined Patent Application, First Publication No. 2006-168434
[Patent Document 2]
    Japanese Patent No. 5238305

SUMMARY OF INVENTION

Problems to be Solved by the Invention

In the vehicle body structure of Patent Document 2, the closed cross sections of both the upper cross member and the rear bulkhead are connected. Further, the damper-mounting portion is provided at the end portion of the upper cross member. A damper (a suspension) is provided at the damper-mounting portion, and a rear wheel is supported by the suspension. Therefore, a load from the rear wheel is input to the end portion (the damper-mounting portion) of the upper cross member.

Here, each of the upper cross member and the rear bulkhead gusset is connected by the closed cross section. Therefore, it is conceivable that the load input to the damper-mounting portion of the upper cross member will be directly transmitted to the damper-mounting portion on the opposite side in the vehicle width direction through the upper cross member. Therefore, there is still room for improvement from the viewpoint of riding comfort in a vehicle.

Therefore, the present invention provides a vehicle body structure in which riding comfort in a vehicle is able to be further improved.

Means for Solving the Problem

A vehicle body structure according to an aspect of the present invention employs the following constitution to solve the above problems.

(1) A vehicle body structure according to an aspect of the present invention includes a rear bulkhead which partitions a vehicle compartment from a trunk compartment, a wheel house inner located inside a wheel house in a vehicle width direction, and a damper-mounting portion provided outside the wheel house inner in the vehicle width direction, wherein the rear bulkhead includes a side closed cross section portion that forms a closed cross section which extends along the wheel house inner in a vertical direction, and an upper closed cross section portion that forms a closed cross section which extends above the side closed cross section portion in the vehicle width direction, and the side closed cross section portion includes at least one of a fending portion of which a closed cross-sectional area is reduced compared to another region and a fending portion of which a closed cross-sectional area is zero between the upper closed cross-section portion and the damper-mounting portion.

(2) In the vehicle body structure according to the aspect of (1), the wheel house inner may include a U-shaped cross section portion formed of an inner side wall which extends in a forward and rearward direction of a vehicle body, and an inner front wall and an inner rear wall which are disposed to be spaced apart from each other in the forward and rearward direction of the vehicle body and extend outward from the inner side wall in the vehicle width direction, and the side closed cross section portion may include a closed cross section between a lower portion of the side closed cross section portion and the inner side wall and may be in contact with the inner side wall and at least any one of the inner front wall and the inner rear wall at an upper portion of the side closed cross section portion.

(3) In the vehicle body structure according to the aspect of (2), the damper-mounting portion may be provided inside the U-shaped cross section portion, and the side closed cross section portion may extend to the same height as that of the damper-mounting portion in the vertical direction.

(4) The vehicle body structure according to the aspect of (3) may include a suspension-mounting portion in which a suspension device is attached to a floor side of a vehicle, and the side closed cross section portion may extend upward from the suspension-mounting portion.

(5) The vehicle body structure according to the aspect of (4) may include a second suspension-mounting portion provided on the floor side and disposed to be spaced apart from the suspension-mounting portion in the forward and rearward direction of the vehicle body, and a second side closed cross section portion which extends upward from the second suspension-mounting portion and is connected to the damper-mounting portion.

(6) In the vehicle body structure according to the aspect of (5), a first mounting portion having a U-shaped cross section to which the side closed cross section portion is attached, and a second mounting portion having a U-shaped cross section to which the second side closed cross section portion is attached may be provided on the floor side, a component in which the wheel house inner, the side closed cross section portion, and the second side closed cross section portion are integrated in advance may be attached to a component in which the floor, the first mounting portion, and the second mounting portion are integrated in advance, and the side closed cross section portion may have a front wall and a rear wall, any one of the front wall and the rear wall may be bonded to the first mounting portion, and the other may be fastened to the first mounting portion.

Advantage of the Invention

According to the aspect of (1), the damper-mounting portion is provided outside the wheel house inner in the vehicle width direction. A damper (a suspension) is provided at the damper-mounting portion, and a rear wheel is supported by the suspension. Therefore, a load from the rear wheel (specifically, the damper) is input from an end portion (the damper-mounting portion) of an upper cross member to the upper closed cross section portion.

Therefore, the side closed cross section portion which extends along the wheel house inner in the vertical direction is provided, and the fending portion is provided between the upper closed cross section portion and the damper-mounting portion. The fending portion includes at least one of a region of which the closed cross-sectional area is reduced compared to another region of the side closed cross section portion and a region of which the closed cross-sectional area is zero.

Therefore, when a load is input from the damper-mounting portion to the upper closed cross section portion, the upper closed cross section portion and the side closed cross section portion can be relatively displaced. Thus, the load from the damper can be fended off (absorbed) by the relative displacement between the upper closed cross section portion and the side closed cross section portion.

Accordingly, the load from the damper being transmitted from the upper closed cross section portion to the damper-mounting portion on the opposite side in the vehicle width direction can be inhibited. As a result, riding comfort in a vehicle can be further improved.

According to the aspect of (2), in the lower portion of the side closed cross section portion, the closed cross section is formed by the lower portion and the inner side wall of the wheel house inner. Thus, rigidity of the wheel house inner can be improved with the formed closed cross section.

On the other hand, in the upper portion of the side closed cross section portion, the upper portion is in contact with at least one of the inner side wall and at least one of the inner front wall and the inner rear wall. Therefore, the upper portion of the side closed cross section portion can be at least one of the fending portion of which the closed cross-sectional area is reduced compared to the lower portion and the fending portion of which the closed cross-sectional area is zero. Thus, when a load is input from the damper-mounting portion to the upper closed cross section portion, the upper closed cross section portion and the side closed cross section portion can be relatively displaced. Accordingly, the load from the damper can be fended off (absorbed) by the relative displacement between the upper closed cross section portion and the side closed cross section portion.

Here, the wheel house inner is formed of the inner side wall, the inner front wall, and the inner rear wall and has a U-shaped cross section portion. Therefore, the wheel house inner is formed with relatively high rigidity. Thus, rigidity of the upper portion of the side closed cross section portion can be enhanced by the wheel house inner.

According to the aspect of (3), the damper-mounting portion is provided inside the U-shaped cross section portion. Therefore, the inner front wall, inner rear wall, and inner side wall of the U-shaped cross section portion can be supported by the damper-mounting portion. Thus, falling down of the inner front wall, the inner rear wall, and the inner side wall can be curbed by the damper-mounting portion.

Further, the side closed cross section portion extends to the same height as that of the damper-mounting portion. Thereby, the rigidity of the side closed cross section portion being lowered can be reliably curbed by the damper-mounting portion.

According to the aspect of (4), the side closed cross section portion extends upward from the suspension-mounting portion. The side closed cross section portion is connected to the damper-mounting portion. The damper-mounting portion is a region to which a load from the rear wheel (specifically, the damper) is input, and is formed with high rigidity. Therefore, the load input from the rear suspension device to the side closed cross section portion can be transmitted to the damper-mounting portion via the side closed cross section portion. Thus, the load input from the rear suspension device to the suspension-mounting portion can be supported by the damper-mounting portion.

According to the aspect of (5), the second side closed cross section portion extends upward from the second suspension-mounting portion. Further, the second side closed cross section portion is connected to the damper-mounting portion. Therefore, the load input from the rear suspension device to the second side closed cross section portion can be transmitted to the damper-mounting portion via the second side closed cross section portion. Thus, the load input from the rear suspension device to the suspension-mounting portion can be supported by the damper-mounting portion.

Moreover, the side closed cross section portion and the second side closed cross section portion which increase rigidity are attached in a state in which they are integrated with (combined with) the damper-mounting portion. A constitution of the vehicle body structure can be simplified by attaching the two side closed cross section portions to the damper-mounting portion in the combined state.

According to the aspect of (6), the wheel house inner, the side closed cross section portion, and the second side closed cross section portion are integrated in advance. The floor, the first mounting portion, and the second mounting portion are integrated in advance. In addition, the integrated components are assembled.

In this case, when the integrated components are assembled, it is necessary to ensure a certain clearance between the side closed cross section portion and the first mounting portion.

Therefore, the front wall and the rear wall are provided on the side closed cross section portion. In addition, any one of the front wall and the rear wall is bonded to the first mounting portion, and the other is fastened to the first mounting portion. As described above, in the state in which a certain clearance is secured between the side closed cross section portion and the first mounting portion by bonding any one of the front wall and the rear wall to the first mounting portion, the side closed cross section portion can be attached on the first mounting portion in a state of being suitably joined thereto.

DESCRIPTION OF THE EMBODIMENTS

Figure 1:
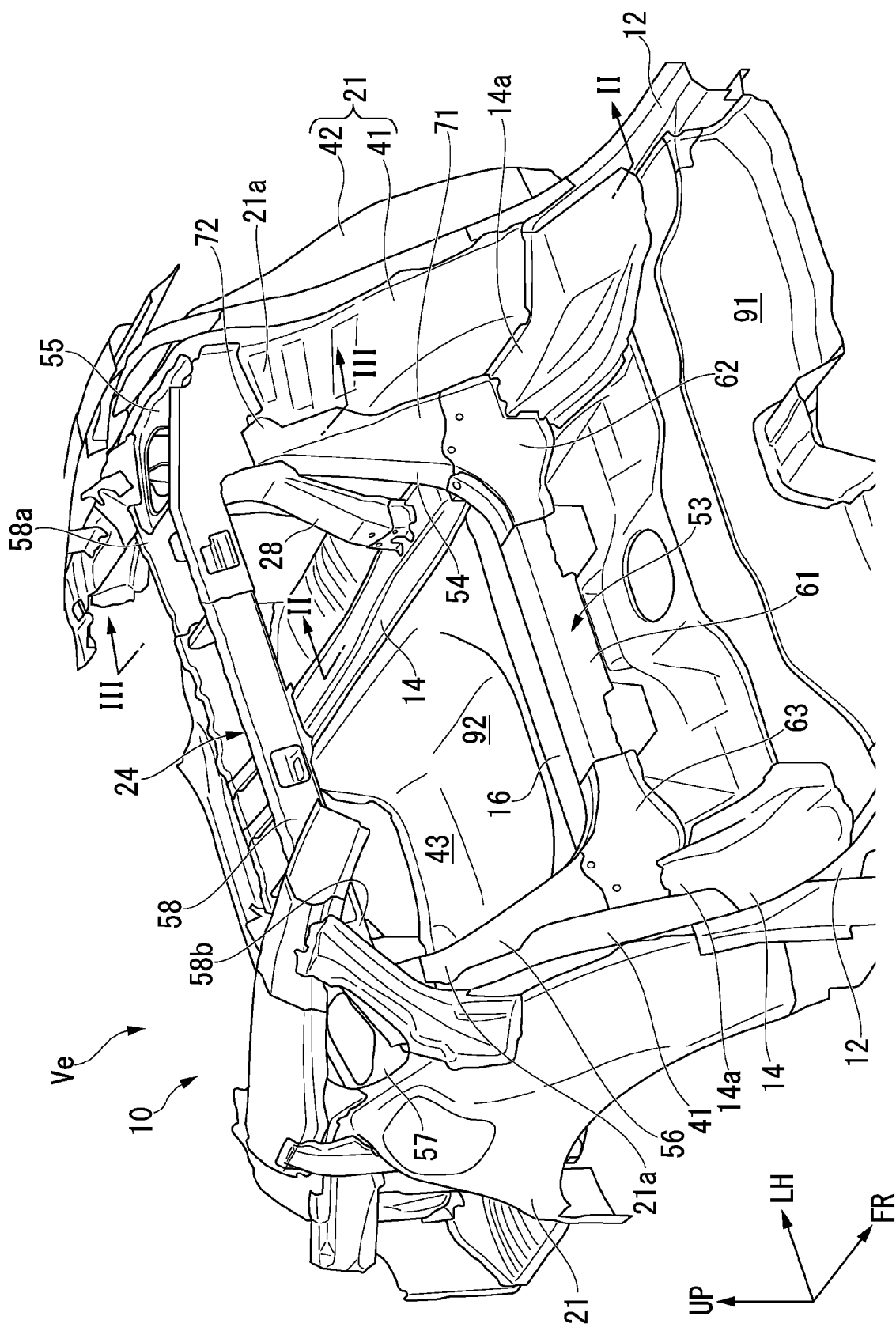
FIG. 1 is a perspective view showing a vehicle body structure in an embodiment of the present invention.

An embodiment of the present invention will be described with reference to the drawings. In the drawing, an arrow FR indicates forward in a vehicle, an arrow UP indicates upward in the vehicle, and an arrow LH indicates leftward in the vehicle.

A vehicle body structure 10 has a substantially bilaterally symmetrical constitution. Therefore, left side constituents and right side constituents are designated by the same reference numerals, a left side constitution will be described, and description of a right side constitution will be omitted.

Figure 2:
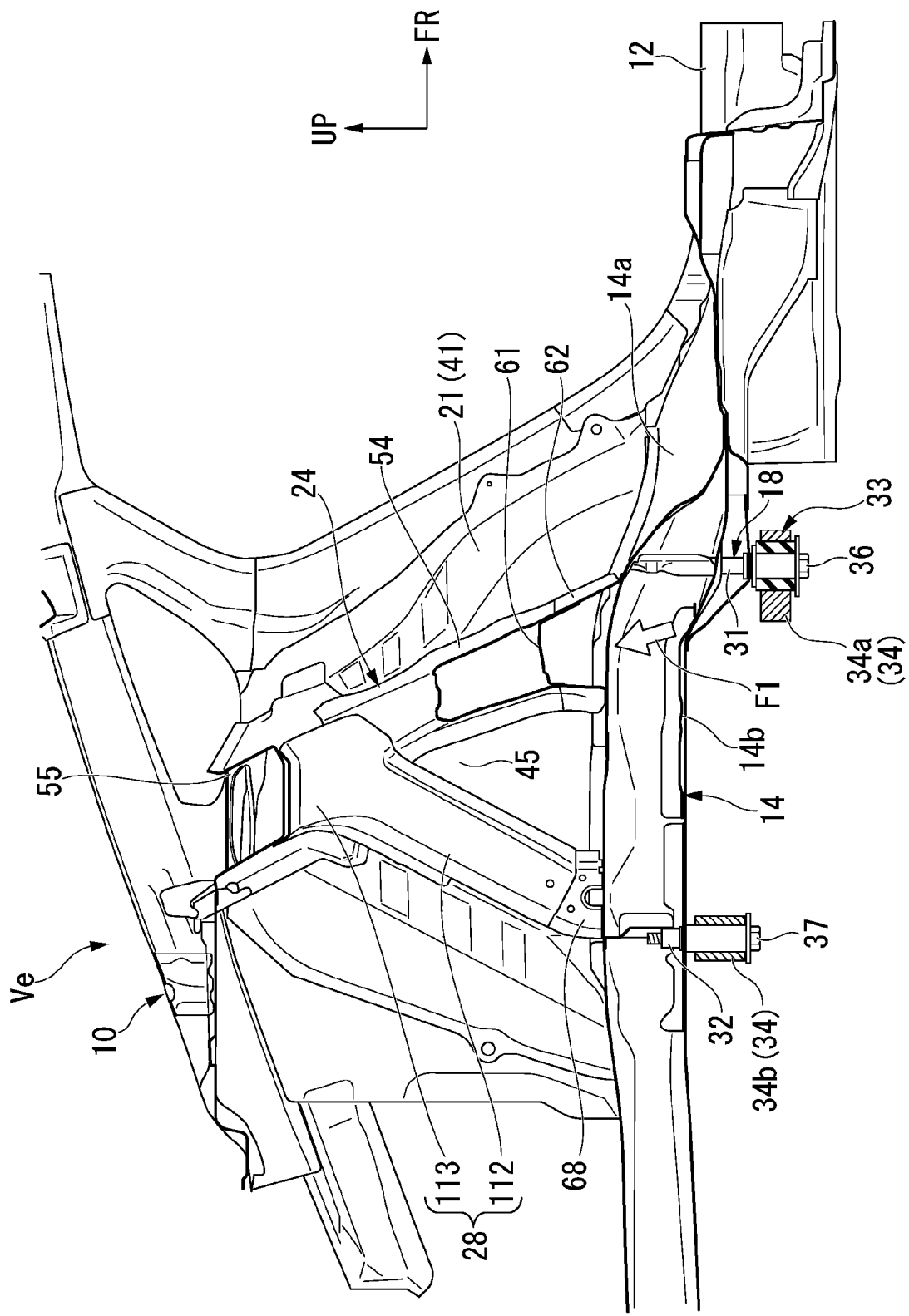
FIG. 2 is a cross-sectional view showing a state broken along line II-II in FIG. 1 according to the embodiment of the present invention.

As shown in FIGS. 1 and 2, the vehicle body structure 10 includes right and left side seals 12, right and left rear side frames 14, a rear floor panel (floor) 16, right and left suspension support portions 18 (the right suspension support portion 18 is not shown), right and left wheel houses 21, a rear bulkhead 24, right and left damper-mounting portions (damper-mounting portions) 26 (refer to FIG. 7), and right and left second side closed cross section portions 28 (second side closed cross section portions 28) 28.

The left side seal 12 and the right side seal 12 are disposed on the left outer side and the right outer side in the vehicle width direction with respect to a center portion of a vehicle Ve in the forward and rearward direction and extend in the forward and rearward direction of a vehicle body.

The left rear side frame 14 extends toward a rear of a vehicle body from a rear end portion of the left side seal 12. Further, the right rear side frame 14 extends toward the rear of the vehicle body from a rear end portion of the right side seal 12.

The rear floor panel 16 is provided between the left rear side frame 14 and the right rear side frame 14.

The left suspension support portion 18 is provided on left rear side frame 14. The left suspension support portion 18 includes a first suspension-mounting portion (a suspension-mounting portion) 31 and a second suspension-mounting portion (a suspension-mounting portion) 32. The first suspension-mounting portion 31 is provided at a front portion 14a of the left rear side frame 14.

The second suspension-mounting portion 32 is provided on the rear side of the vehicle body with respect to the first suspension-mounting portion 31 with a gap therebetween. That is, the second suspension-mounting portion 32 is provided to be spaced apart from the first suspension-mounting portion 31 in the forward and rearward direction of the vehicle body.

Here, the rear floor panel 16 is provided on the left rear side frame 14. Therefore, the left suspension support portion 18 is provided on the side of the rear floor panel 16 of the vehicle Ve. Similarly, the right suspension support portion 18 (not shown) is provided on the side of the rear floor panel 16 of the vehicle Ve.

A sub-frame 34 of a rear suspension device (a suspension device) 33 is mounted on the first suspension-mounting portion 31 and the second suspension-mounting portion 32. Specifically, a left front end portion 34a of the sub-frame 34 is fastened to the first suspension-mounting portion 31 by a fastening member such as a bolt 36. A left rear end portion 34b of the sub-frame 34 is fastened to the second suspension-mounting portion 32 by a fastening member such as a bolt 37.

In this state, the left front end portion 34a and the left rear end portion 34b of the sub-frame 34 are mounted on a bottom portion 14b of the left rear side frame 14.

Figure 3:
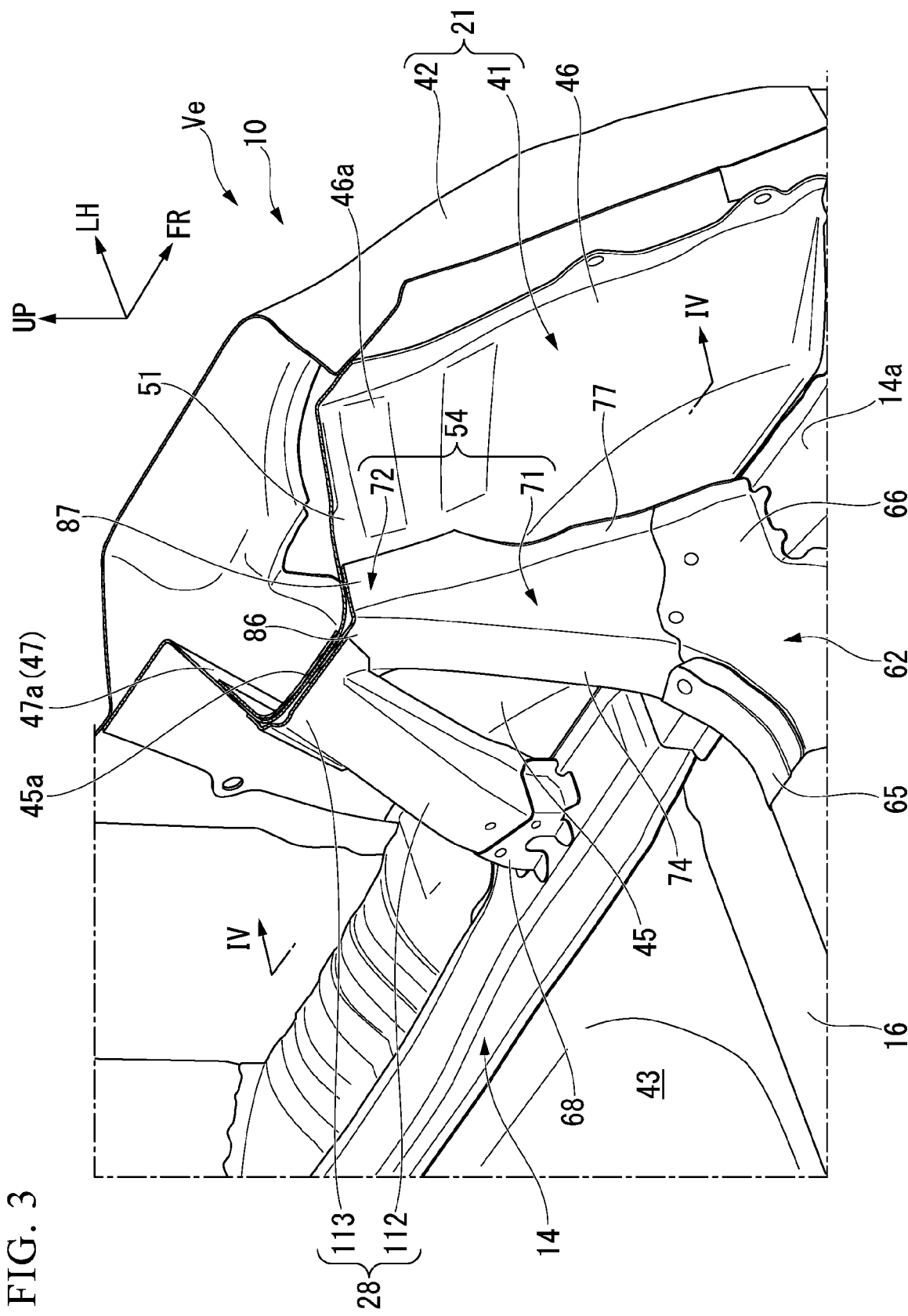
FIG. 3 is a perspective view showing a cut-away state along line in FIG. 1 according to the embodiment of the present invention.
Figure 4:
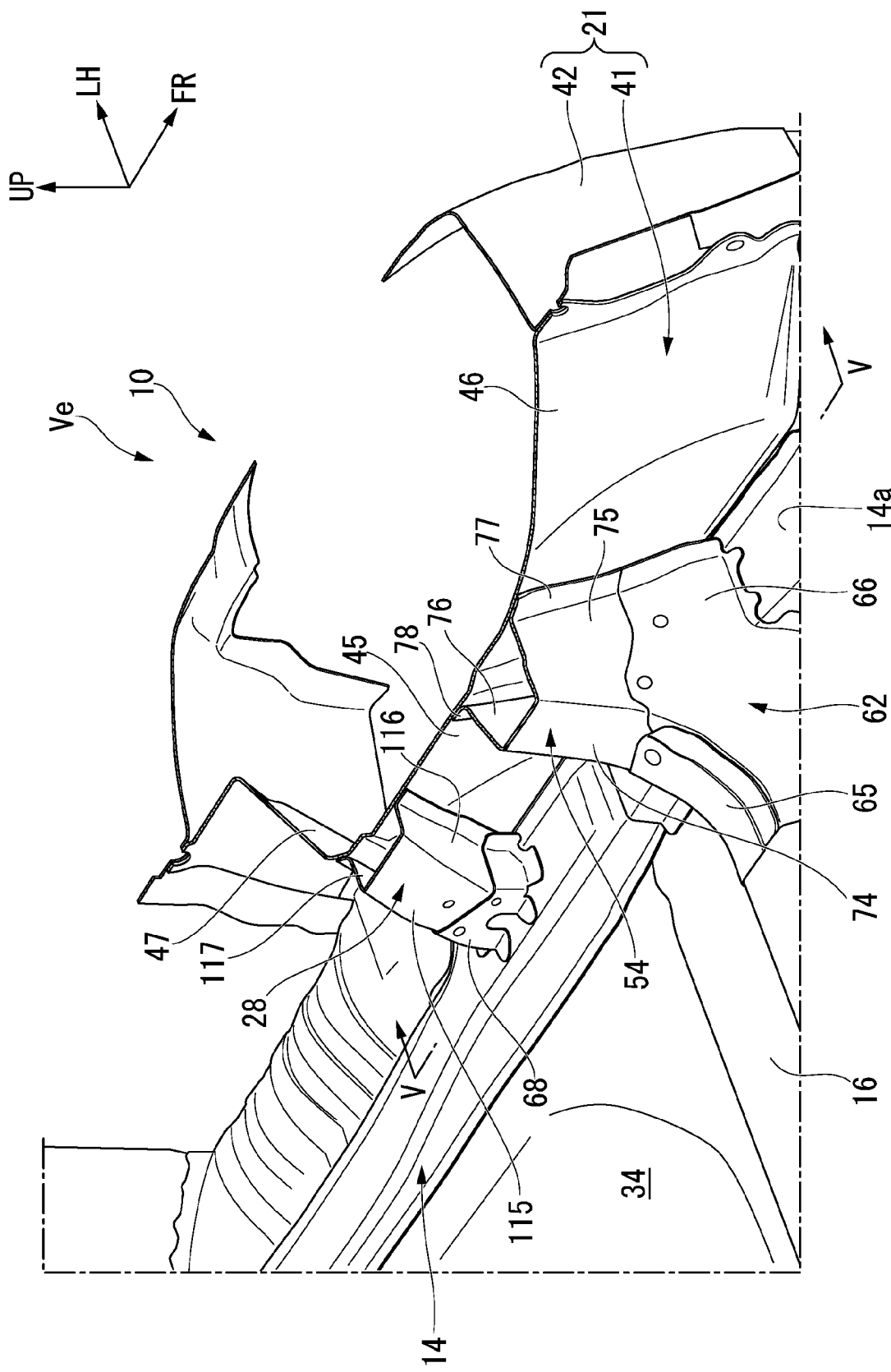
FIG. 4 is a perspective view showing a state broken along line IV-IV in FIG. 3 according to the embodiment of the present invention.

As shown in FIGS. 3 and 4, the left wheel house 21 is mounted on the outer side and on the front portion 14a of the left rear side frame 14. The left wheel house 21 includes a wheel house inner 41 and a wheel house outer 42. The wheel house inner 41 is located on the side of a vehicle interior 43 of the left wheel house 21. The wheel house inner 41 is joined to an outer portion of the front portion 14a of the left rear side frame 14. The wheel house outer 42 is joined to an outer portion of the wheel house inner 41.

The wheel house inner 41 includes an inner side wall (a side wall) 45, an inner front wall (a front wall, a front surface) 46, and an inner rear wall (a rear wall, a rear surface) 47.

The inner side wall 45 is formed to extend in the forward and rearward direction of the vehicle body. The inner front wall 46 is connected to a front side of the inner side wall 45. The inner front wall 46 extends outward from the front side of the inner side wall 45 in the vehicle width direction to be slightly inclined toward a front of the vehicle body.

The inner rear wall 47 is connected to a rear side of the inner side wall 45. The inner rear wall 47 extends outward from the rear side of the inner side wall 45 in the vehicle width direction to be inclined toward the rear of the vehicle body. The inner front wall 46 and the inner rear wall 47 are disposed to be spaced apart from each other in the forward and rearward direction of the vehicle body.

The wheel house inner 41 is formed by the inner side wall 45, the inner front wall 46, and the inner rear wall 47 to have a U-shaped cross section which opens outward in the vehicle width direction.

Here, the wheel house inner 41 has a U-shaped cross section portion 51 at an upper portion thereof. The U-shaped cross section portion 51 is formed by an upper portion 45a of the inner side wall 45, an upper portion 46a of the inner front wall 46, and an upper portion 47a of the inner rear wall 47 to have a U-shaped cross section which opens outward in the vehicle width direction.

As shown in FIG. 1, the rear bulkhead 24 is provided between the left wheel house 21 and the right wheel house 21. The rear bulkhead 24 includes a floor cross member 53, a left first side closed cross section portion (a side closed cross section portion) 54, a left upper closed cross section portion (an upper closed cross section portion) 55, a right first side closed cross section portion (a side closed cross section portion) 56, a right upper closed cross section portion (an upper closed cross section portion) 57, and an upper cross member 58.

The floor cross member 53 extends over the front portion 14a of the left rear side frame 14 and the front portion 14a of the right rear side frame 14. The floor cross member 53 includes a central member 61 provided on the rear floor panel 16, a left first mounting portion (a first mounting portion) 62 provided at a left end portion of the central member 61, and a right first mounting portion (a first mounting portion) 63 provided at a right end portion of the central member 61.

Figure 5:
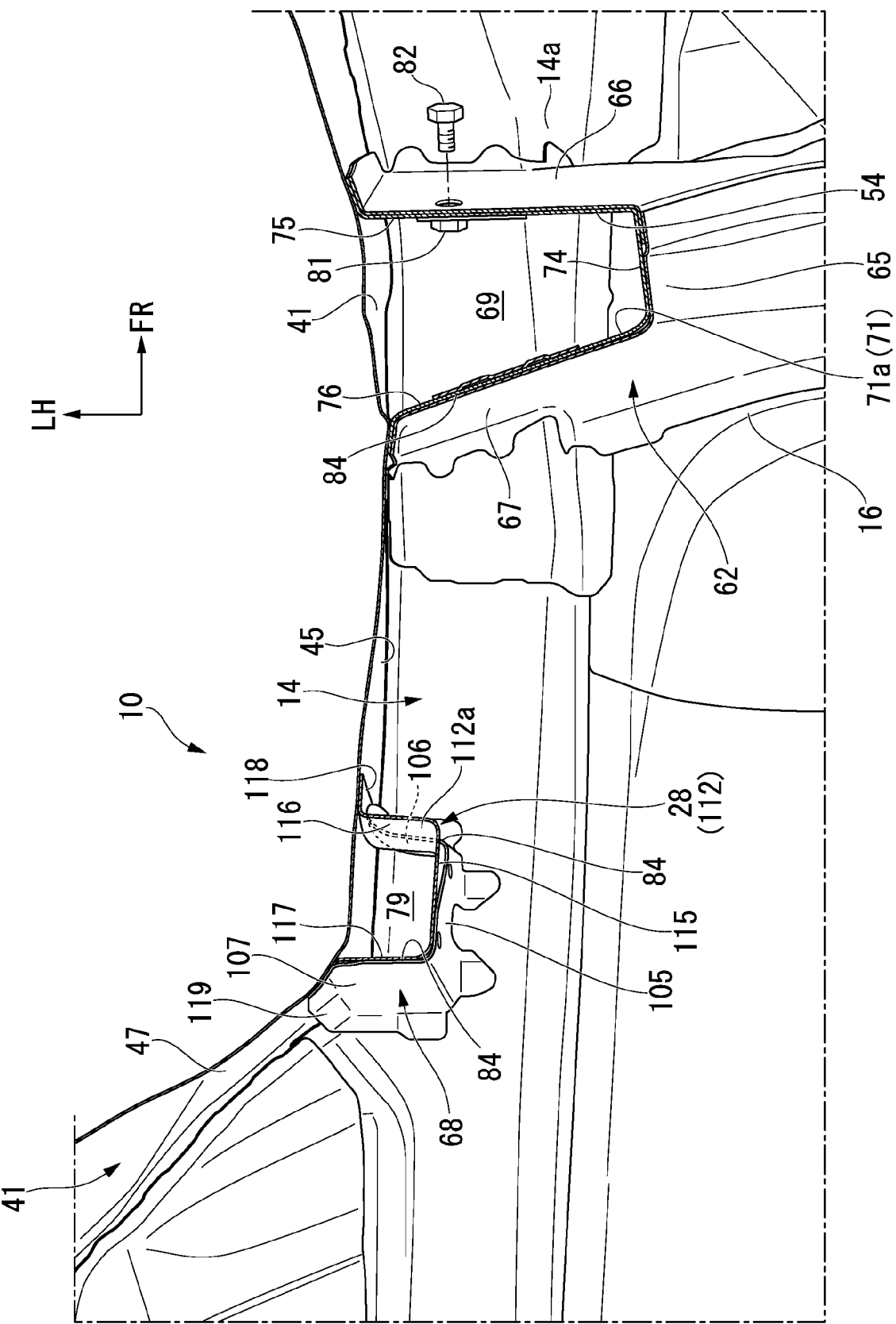
FIG. 5 is a cross-sectional view showing a state broken along line V-V in FIG. 4 according to the embodiment of the present invention.

As shown in FIG. 5, the left first mounting portion 62 is provided above the first suspension-mounting portion 31 (refer to FIG. 2). Specifically, the left first mounting portion 62 is joined to the rear floor panel 16, the front portion 14a of the left rear side frame 14, and the left wheel house inner 41.

The left first mounting portion 62 includes a first mounting side wall 65, a first mounting front wall 66, and a first mounting rear wall 67. The first mounting side wall 65 is formed to extend in the forward and rearward direction of the vehicle body. The first mounting front wall 66 is connected to a front side of the first mounting side wall 65. The first mounting front wall 66 extends outward from the front side of the first mounting side wall 65 in the vehicle width direction.

Further, the first mounting rear wall 67 is connected to a rear side of the first mounting side wall 65. The first mounting rear wall 67 extends outward from the rear side of the first mounting side wall 65 in the vehicle width direction to be inclined toward the rear of the vehicle body. The first mounting front wall 66 and the first mounting rear wall 67 are disposed to be spaced apart from each other in the forward and rearward direction of the vehicle body.

The left first mounting portion 62 is formed by the first mounting side wall 65, the first mounting front wall 66, and a first mounting rear wall 67 to have a U-shaped cross section which opens outward in the vehicle width direction.

Returning to FIG. 1, the right first mounting portion 63 is joined to the rear floor panel 16, the front portion 14a of the right rear side frame 14, and the right wheel house inner 41.

The right first mounting portion 63 is formed to be bilaterally symmetrical with the left first mounting portion 62.

The floor cross member 53 is joined to the rear floor panel 16, and thus a closed cross section is formed by the floor cross member 53 and the rear floor panel 16.

As shown in FIG. 2, the left first side closed cross section portion 54 is mounted on the left first mounting portion 62. The left first mounting portion 62 is provided above the first suspension-mounting portion 31. The left first side closed cross section portion 54 extends upward from the first suspension-mounting portion 31.

That is, the left first side closed cross section portion 54 extends upward from the left first mounting portion 62 to the left upper closed cross section portion 55 along the wheel house inner 41 (in particular, the inner side wall 45) to be inclined toward the rear of the vehicle body. The left first side closed cross section portion 54 is joined to the wheel house inner 41, and thus a closed cross section is formed by the left first side closed cross section portion 54 and the wheel house inner 41 (refer to FIG. 4).

Furthermore, the first side closed cross section portion 54 extends upward from the first suspension-mounting portion 31. The first side closed cross section portion 54 is connected to the left damper-mounting portion 26 (refer to FIG. 7). The left damper-mounting portion 26 is a portion to which a load from a rear wheel (specifically, a damper) is input and is formed with high rigidity.

Therefore, a load F1 input from the rear suspension device to the first side closed cross section portion 54 can be transmitted to the left damper-mounting portion 26 via the first side closed cross section portion 54. Thus, the load F1 input from the rear suspension device to the first suspension-mounting portion 31 can be supported by the left damper-mounting portion 26.

Figure 6:
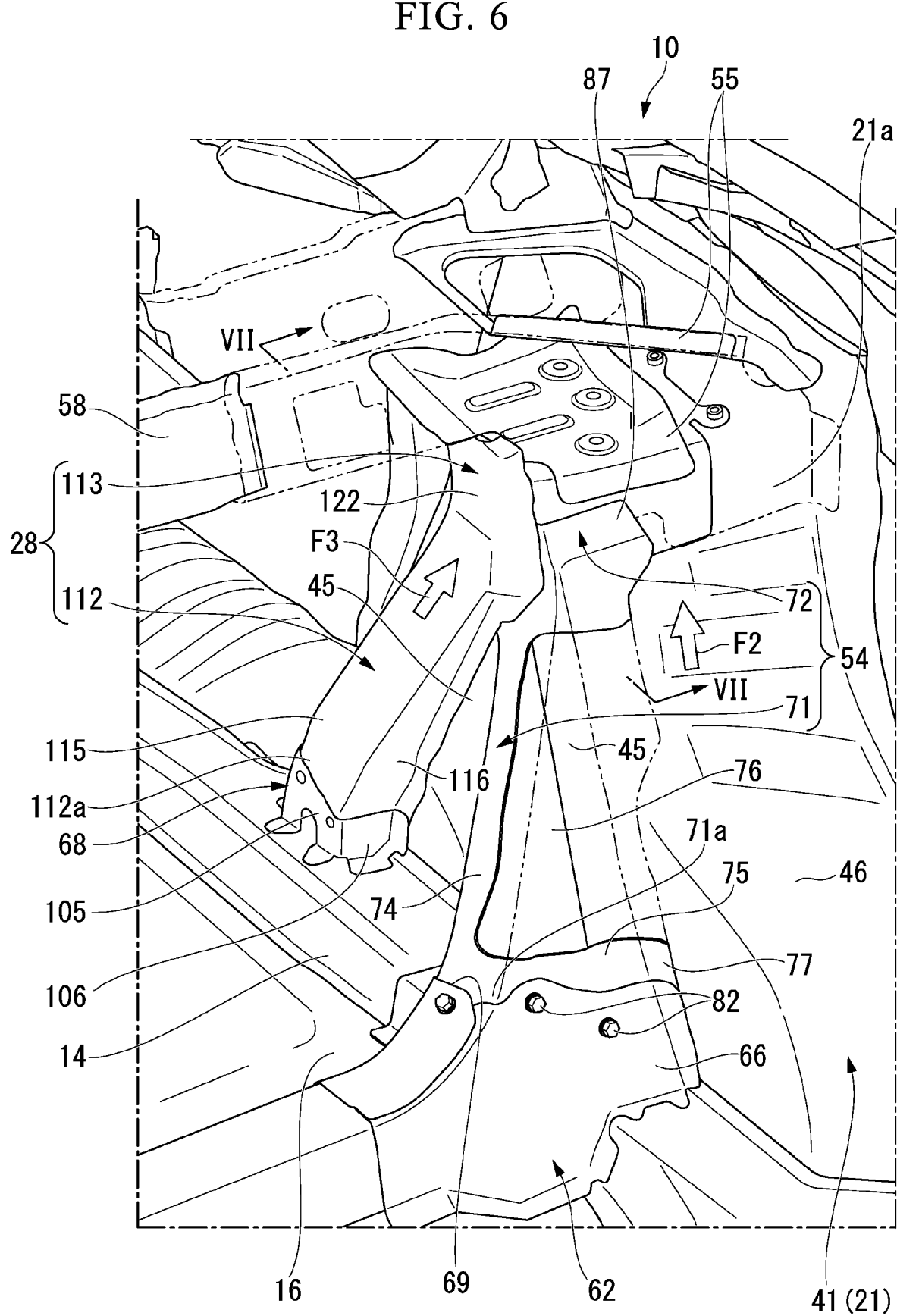
FIG. 6 is a perspective view showing an enlarged state of a VI portion in FIG. 3 according to the embodiment of the present invention.

As shown in FIGS. 4 and 6, the left first side closed cross section portion 54 includes a first side leg portion 71 and a first fending portion (a fending portion) 72. The first side leg portion 71 forms a lower portion (specifically, a portion below an upper portion) of the left first side closed cross section portion 54. The first side leg portion 71 includes a first leg side wall 74, a first leg front wall (a front wall) 75, and a first leg rear wall (a rear wall) 76. The first leg side wall 74 is disposed to face the inner side wall 45 of the wheel house inner 41.

That is, the first leg side wall 74 is formed to extend in the forward and rearward direction of the vehicle body. The first leg front wall 75 is connected to a front side of the first leg side wall 74. The first leg front wall 75 extends outward from the front side of the first leg side wall 74 in the vehicle width direction.

Further, the first leg rear wall 76 is connected to a rear side of the first leg side wall 74. The first leg rear wall 76 extends outward from the rear side of the first leg side wall 74 in the vehicle width direction to be inclined toward the rear of the vehicle body. The first leg front wall 75 and the first leg rear wall 76 are disposed to be spaced apart from each other in the forward and rearward direction of the vehicle body.

The first side leg portion 71 is formed by the first leg side wall 74, the first leg front wall 75, and the first leg rear wall 76 to have a U-shaped cross section which opens outward in the vehicle width direction.

In the first side leg portion 71, a front flange 77 of the first leg front wall 75 is joined to the wheel house inner 41. A rear flange 78 of the first leg rear wall 76 is joined to the wheel house inner 41. A closed cross section is formed by the first side leg portion 71 and the wheel house inner 41. The rigidity of the wheel house inner 41 is enhanced by the closed cross section formed by the left first side closed cross section portion 54 and the wheel house inner 41.

As shown in FIG. 5, a base portion 71a of the first side leg portion 71 is disposed at an interior 69 of the left first mounting portion 62. In this state, the first leg side wall 74 of the first side leg portion 71 is in contact with the first mounting side wall 65 of the left first mounting portion 62. A nut 81 is welded to a back surface of the first leg front wall 75 of the first side leg portion 71. The first leg front wall 75 is in contact with the first mounting front wall 66 of the left first mounting portion 62 and is fastened to the first mounting front wall 66 by a bolt 82 and the nut 81.

Further, the first leg rear wall 76 of the first side leg portion 71 is disposed in contact with or adjacent to the first mounting rear wall 67 of the left first mounting portion 62. An adhesive 84 is interposed between the first leg rear wall 76 and the first mounting rear wall 67. That is, the first leg rear wall 76 is bonded to the first mounting rear wall 67 with the adhesive 84.

Therefore, the base portion 71a of the first side leg portion 71 is mounted on the left first mounting portion 62.

Figure 7:
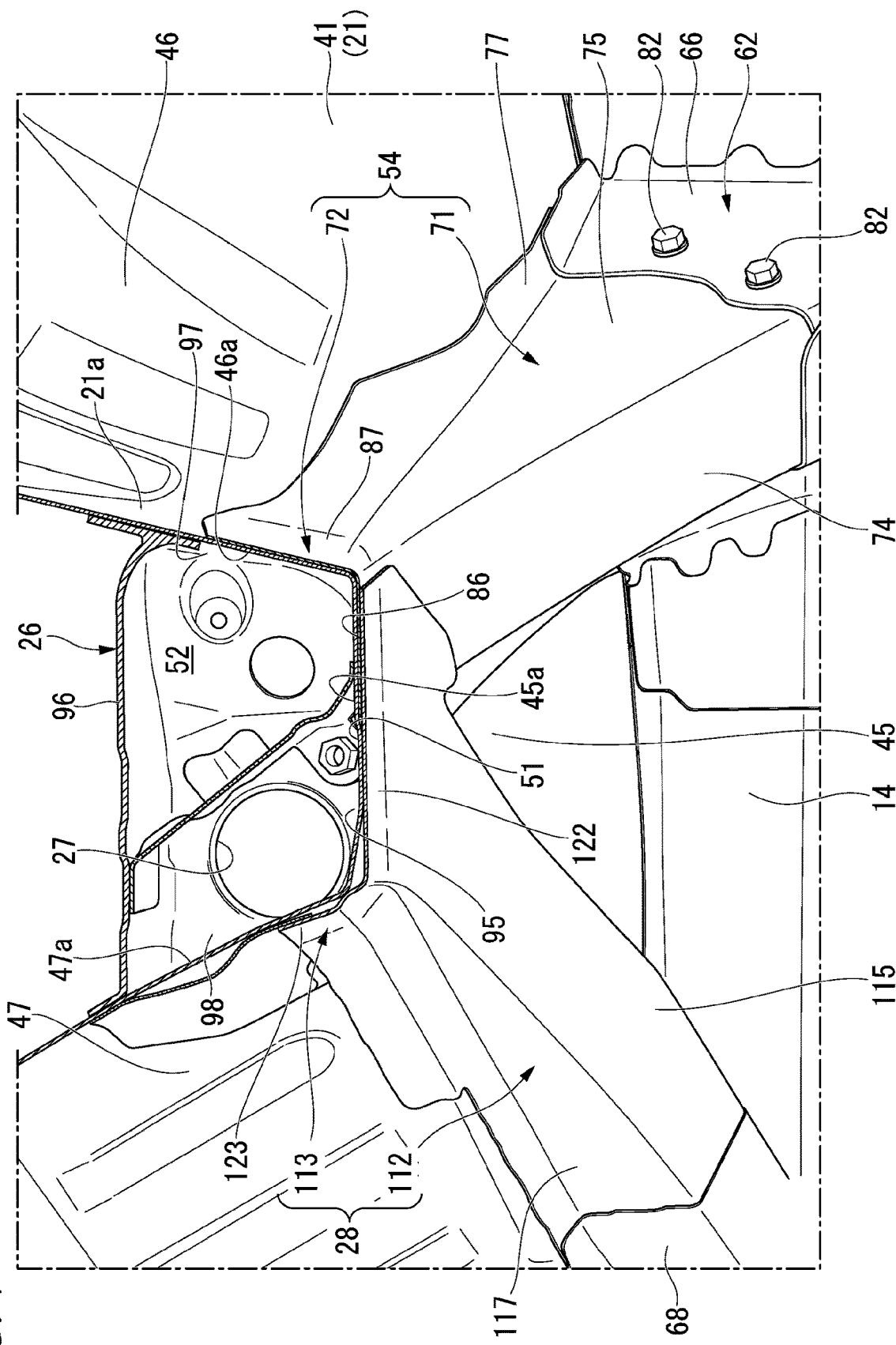
FIG. 7 is a cross-sectional view showing a damper-mounting portion of the vehicle body structure in the embodiment of the present invention.

As shown in FIGS. 6 and 7, the first fending portion 72 (that is, an upper portion of the left first side closed cross section portion 54) is formed on an upper end portion 71b of the first side leg portion 71. Here, the first side leg portion 71 is formed to be inclined to gradually approach the inner side wall 45 from the base portion 71a (that is, the left first mounting portion 62) of the first side leg portion 71 to the first fending portion 72.

The first fending portion 72 is disposed between the first side leg portion 71 and the left upper closed cross section portion 55. In other words, the first fending portion 72 is provided between the left upper closed cross section portion 55 and the left damper-mounting portion 26.

The first fending portion 72 includes a first fending side wall 86 and a first fending front wall 87. The first fending side wall 86 is formed along the upper portion 45a of the inner side wall 45 and is joined to the upper portion 45a of the inner side wall 45. The first fending front wall 87 extends outward from a front side of the first fending side wall 86 in the vehicle width direction. The first fending front wall 87 is formed along the upper portion 46a of the inner front wall 46 and is joined to the upper portion 46a. The first fending portion 72 is formed by the first fending side wall 86 and the first fending front wall 87 to have an L-shaped cross section.

In this state, the first fending portion 72 is formed so that a closed cross-sectional area thereof is reduced as compared with the first side leg portion 71 (that is, the other portion of the left first side closed cross section portion 54).

In this way, in the first fending portion 72 (that is, the upper portion of the first side closed cross section portion 54), the first fending portion 72 is brought into contact with the upper portion 45a of the inner side wall 45 and the upper portion 46a of the inner front wall 46. That is, the left first side closed cross section portion 54 is formed so that the first fending portion (that is, the upper portion) is in contact with the upper portion 45a of the inner side wall 45 and the upper portion 46a of the inner front wall 46. Therefore, the closed cross-sectional area of the first fending portion 72 can be reduced as compared with the first side leg portion 71.

Accordingly, when the load F2 input from the left damper-mounting portion 26 to the left upper closed cross section portion 55 is applied, the left upper closed cross section portion 55 and the first fending portion 72 can be relatively displaced. A load from the damper can be fended off (absorbed) by the relative displacement between the left upper closed cross section portion 55 and the first fending portion 72.

Here, the wheel house inner 41 is formed by the inner side wall 45, the inner front wall 46, and the inner rear wall 47 to have the U-shaped cross section. Therefore, the wheel house inner 41 is formed with relatively high rigidity. Thus, the rigidity of the first fending portion 72 can be supplemented by the wheel house inner 41.

Returning to FIG. 1, the left upper closed cross section portion 55 is provided at the upper portion (that is, the first fending portion 72) of the left first side closed cross section portion 54 and an upper portion 21a of the left wheel house 21. The left upper closed cross section portion 55 is formed to have a closed cross section which is above the first fending portion 72 and extends in the vehicle width direction.

Further, the right upper closed cross section portion 57 is provided at the upper end portion (that is, the first fending portion 72) of the right first side closed cross section portion 56 and the upper portion 21a of the right wheel house 21.

The upper cross member 58 extends over the left upper closed cross section portion 55 and the right upper closed cross section portion 57. That is, a left end portion 58a of the upper cross member 58 is connected to the left upper closed cross section portion 55. A right end portion 58b of the upper cross member 58 is connected to the right upper closed cross section portion 57.

The upper cross member 58 is joined to a front end portion of a rear parcel (not shown). Since the upper cross member 58 is joined to the front end portion of the rear parcel, a closed cross section is formed by the upper cross member 58 and the front end portion of the rear parcel. A vehicle compartment 91 and a trunk compartment 92 are partitioned by the rear bulkhead 24.

As shown in FIGS. 6 and 7, the left damper-mounting portion 26 is provided at the upper portion 21a of the left wheel house 21 below the left upper closed cross section portion 55. Specifically, in the upper portion 21a of the left wheel house 21, the left damper-mounting portion 26 is provided inside the wheel house inner 41. The left damper-mounting portion 26 is disposed at the same height as that of the left first side closed cross section portion 54. In other words, the left first side closed cross section portion 54 extends to the same height as that of the left damper-mounting portion 26 in the vertical direction. Therefore, the damper-mounting portion 26 can reliably suppress the rigidity of the first side closed cross section portion 54 from being lowered.

The left damper-mounting portion 26 includes a damper inner wall 95, a damper outer wall 96, a damper front wall 97, and a damper rear wall 98. The left damper-mounting portion 26 is formed by the damper inner wall 95, the damper outer wall 96, the damper front wall 97, and the damper rear wall 98 to have a trapezoidal shape in plan view.

The left damper-mounting portion 26 is provided in an inner side 52 of the U-shaped cross section portion 51. Specifically, the damper inner wall 95 is joined to the upper portion 45a of the inner side wall 45. The damper front wall 97 is joined to the upper portion 46a of the inner front wall 46. The damper rear wall 98 is joined to the upper portion 47a of the inner rear wall 47. Accordingly, the left damper-mounting portion 26 is joined in a state in which it is accommodated in the inner side 52 of the U-shaped cross section portion 51.

Therefore, the upper portion 46a of the inner front wall 46, the upper portion 47a of the inner rear wall 47, and the upper portion 45a of the inner side wall 45 of the U-shaped cross section portion 51 can be supported by the left damper-mounting portion 26. Thus, falling of the inner front wall 46, the inner rear wall 47, and the inner side wall 45 can be suppressed by the left damper-mounting portion 26.

A damper of the rear suspension device 33 (refer to FIG. 2) is mounted on the left damper-mounting portion 26. Specifically, a mounting opening portion 27 is formed in the left damper-mounting portion 26. An upper portion of the damper is mounted on the left damper-mounting portion 26 in a state in which the upper portion of the damper is fitted into the mounting opening portion 27. The rear wheel is supported by a bottom portion of the damper.

Therefore, a load from the rear wheel is transmitted to the left damper-mounting portion 26 through the damper.

As shown in FIGS. 5 and 6, in the left rear side frame 14, a left second mounting portion (a second mounting portion) 68 is provided on the rear side of the vehicle body with respect to the left first mounting portion 62 with a gap therebetween.

The left second mounting portion 68 includes a second mounting side wall 105, a second mounting front wall 106, and a second mounting rear wall 107. The second mounting side wall 105 is formed to extend in the forward and rearward direction of the vehicle body. The second mounting front wall 106 is connected to a front side of the second mounting side wall 105. The second mounting front wall 106 extends outward from the front side of the second mounting side wall 105 in the vehicle width direction.

Further, the second mounting rear wall 107 is connected to a rear side of the second mounting side wall 105. The second mounting rear wall 107 extends outward from the rear side of the second mounting side wall 105 in the vehicle width direction. The second mounting front wall 106 and the second mounting rear wall 107 are disposed to be spaced apart from each other in the forward and rearward direction of the vehicle body.

The left second mounting portion 68 is formed by the second mounting side wall 105, the second mounting front wall 106, and the second mounting rear wall 107 to have a U-shaped cross section which opens outward in the vehicle width direction.

The left second side closed cross section portion 28 is mounted on the left second mounting portion 68. The left second mounting portion 68 is provided above the second suspension-mounting portion 32 (refer to FIG. 2). Accordingly, the left second side closed cross section portion 28 extends upward from the second suspension-mounting portion 32. Specifically, the second side closed cross section portion 28 extends upward from the left second mounting portion 68 to the left upper closed cross section portion 55 along the wheel house inner 41 (particularly, the inner side wall 45) and to be inclined toward the front of the vehicle body.

In this way, the left second side closed cross section portion 28 extends upward from the second suspension-mounting portion 32 (refer to FIG. 2). Further, the left second side closed cross section portion 28 is connected to the left damper-mounting portion 26 via the wheel house inner 41. Therefore, a load F3 input from the second suspension-mounting portion 32 to the left second side closed cross section portion 28 can be transmitted to the left damper-mounting portion 26 (refer to FIG. 7) via the left second side closed cross section portion 28. Thus, the load F3 input from the rear suspension device 33 to the second suspension-mounting portion 32 can be supported by the left damper-mounting portion 26.

Further, the first side closed cross section portion 54 and the left second side closed cross section portion 28 are mounted on the left damper mounted portion 26 in an integrated (combined) state. The rigidity of the wheel house inner 41 is enhanced by the first side closed cross section portion 54 and the left second side closed cross section portion 28.

A constitution of the vehicle body structure 10 is simplified by mounting the two side closed cross section portions of the first side closed cross section portion 54 and the left second side closed cross section portion 28 on the left damper-mounting portion 26 in the combined state (refer to FIG. 7).

Further, since the left second side closed cross section portion 28 is joined to the wheel house inner 41, a closed cross section is formed by the left second side closed cross section portion 28 and the wheel house inner 41. Thus, the rigidity of the wheel house inner 41 is enhanced by the formed closed cross section.

The left second side closed cross section portion 28 includes a second side leg portion 112 and a second fending portion 113, as in the first side closed cross section portion 54. The second side leg portion 112 includes a second leg side wall 115, a second leg front wall 116, and a second leg rear wall 117.

The second leg side wall 115 is disposed to face the inner side wall 45 of the wheel house inner 41. That is, the second leg side wall 115 is formed to extend in the forward and rearward direction of the vehicle body. The second leg front wall 116 is connected to a front side of the second leg side wall 115. The second leg front wall 116 extends outward from the front side of the second leg side wall 115 in the vehicle width direction.

Further, the second leg rear wall 117 is connected to a rear side of the second leg side wall 115. The second leg rear wall 117 extends outward from the rear side of the second leg side wall 115 in the vehicle width direction. The second leg front wall 116 and the first leg rear wall 76 are disposed to be spaced apart from each other in the forward and rearward direction of the vehicle body.

The second side leg portion 112 is formed by the second leg side wall 115, the second leg front wall 116, and the second leg rear wall 117 to have a U-shaped cross section which opens outward in the vehicle width direction.

In the second side leg portion 112, a front flange 118 of the second leg front wall 116 is joined to the inner side wall 45 of the wheel house inner 41, and a rear flange 119 of the second leg rear wall 117 is joined to the inner rear wall 47 of the wheel house inner 41. A closed cross section is formed by the second side leg portion 112 and the wheel house inner 41.

A base portion 112a of the second side leg portion 112 is disposed at an inner side 79 of the left second mounting portion 68. In this state, the second leg side wall 115 of the first side leg portion 71 is in contact with the second mounting side wall 105 of the left second mounting portion 68. The second leg front wall 116 is disposed in contact with or adjacent to the second mounting front wall 106 of the left second mounting portion 68. The second leg front wall 116 is bonded to the second mounting front wall 106 with an adhesive 84.

Further, the second leg rear wall 117 of the second side leg portion 112 is disposed in contact with or adjacent to the second mounting rear wall 107 of the left second mounting portion 68. The second leg rear wall 117 is bonded to the second mounting rear wall 107 with the adhesive 84. Therefore, the base portion 112a of the second side leg portion 112 is mounted on the left second mounting portion 68.

The second fending portion 113 (that is, an upper portion of the left second side closed cross section portion 28) is formed at an upper end portion of the second side leg portion 112.

Here, the second side leg portion 112 is formed to be inclined to gradually approach the inner side wall 45 from the base portion 112a (that is, the left second mounting portion 68) of the second side leg portion 112 to the second fending portion 113, as in the first side leg portion 71. The second fending portion 113 is disposed between the second side leg portion 112 and the left upper closed cross section portion 55. In other words, the second fending portion 113 is provided between the left upper closed cross section portion 55 and the left damper-mounting portion 26.

The second fending portion 113 includes a second fending side wall 122 and a second fending rear wall 123. The second fending side wall 122 is formed along the upper portion 45a of the inner side wall 45 and joined to the upper portion 45a. The second fending rear wall 123 extends outward from a rear side of the second fending side wall 122 in the vehicle width direction. The second fending rear wall 123 is formed along the upper portion 47a of the inner rear wall 47 and joined to the upper portion 47a. The second fending portion 113 is formed by the second fending side wall 122 and the second fending rear wall 123 to have an L-shaped cross section.

In this state, the second fending portion 113 is formed so that a closed cross-sectional area thereof is reduced as compared with the second side leg portion 112 (the other portion of the left second side closed cross section portion 28). In this way, the left second side closed cross section portion 28 is formed so that the second fending portion 113

(that is, the upper portion) is in contact with the upper portion 45a of the inner side wall 45 and the upper portion 47a of the inner rear wall 47.

The left upper closed cross section portion 55 is provided at the upper portion (that is, the second fending portion 113) of the left second side closed cross section portion 28 and the upper portion 21a of the left wheel house 21.

The left damper-mounting portion 26 is provided inside the wheel house inner 41 of the left wheel house 21 below the left upper closed cross section portion 55. That is, the left second side closed cross section portion 28 extends to the same height as that of the left damper-mounting portion 26 in the vertical direction. Therefore, the left damper-mounting portion 26 can reliably suppress the rigidity of the left second side closed cross section portion 28 being lowered.

Further, the upper portion (that is, the second fending portion 113) of the left second side closed cross section portion 28 is connected to the left damper-mounting portion 26. The left upper closed cross section portion 55 is formed to have a closed cross section which is above the second fending portion 113 and extends in the vehicle width direction.

Further, the second fending portion 113 is in contact with the upper portion 45a of the inner side wall 45 and the upper portion 47a of the inner rear wall 47. Therefore, the cross-sectional area of the second fending portion 113 can be reduced compared to that of the second side leg portion 112. Thus, when the load F3 input from the left damper-mounting portion 26 to the left upper closed cross section portion 55 is applied, the left upper closed cross section portion 55 and the second fending portion 113 can be relatively displaced. Therefore, the load from the damper can be fended off (absorbed) by the relative displacement between the left upper closed cross section portion 55 and the second fending portion 113.

Thus, when the load F2 input from the left damper-mounting portion 26 to the left upper closed cross section portion 55 is applied, the left upper closed cross section portion 55 and the first fending portion 72 can be relatively displaced. The load from the damper can be fended off (absorbed) by the relative displacement between the left upper closed cross section portion 55 and the first fending portion 72.

Here, the U-shaped cross section portion 51 of the wheel house inner 41 is formed by the upper portion 45a of the inner side wall 45, the upper portion 46a of the inner front wall 46, and the upper portion 47a of the inner rear wall 47 to have into a U-shaped cross-section. Therefore, the upper portion 41a of the wheel house inner 41 is formed with relatively high rigidity. Thus, the rigidity of the second fending portion 113 can be supplemented by the wheel house inner 41.

As described above, the first fending portion 72 is provided at the upper end portion of the left first side closed cross section portion 54. The first fending portion 72 has a closed cross-sectional area which is smaller than that of the first side leg portion 71 of the left first side closed cross section portion 54. Further, the second fending portion 113 is provided at the upper end portion of the left second side closed cross section portion 28. The second fending portion 113 has a closed cross-sectional area which is smaller than that of the second side leg portion 112 of the left second side closed cross section portion 28.

Incidentally, the left damper-mounting portion 26 is provided inside the wheel house inner 41. A damper (a suspension) is provided at the left damper-mounting portion 26, and the rear wheel is supported by the suspension. Therefore, the load F2 from the rear wheel (specifically, the damper) is input from the end portion (the left damper-mounting portion 26) of the upper cross member to the left upper closed cross section portion 55.

In this state, the load from the damper can be fended off (absorbed) by the relative displacement between the left upper closed cross section portion 55 and the first fending portion 72. Also, the load from the damper can be fended off (absorbed) by the relative displacement between the left upper closed cross section portion 55 and the second fending portion 113.

Thus, the load F2 from the damper can be suppressed from being transmitted from the left upper closed cross section portion 55 to the second damper-mounting portion 26 on the opposite side (the right side) in the vehicle width direction. As a result, the riding comfort in the vehicle Ve can be further improved.

Next, a process of assembling the vehicle body structure 10 will be described with reference to FIGS. 5, 8 and 9.

Figure 8:
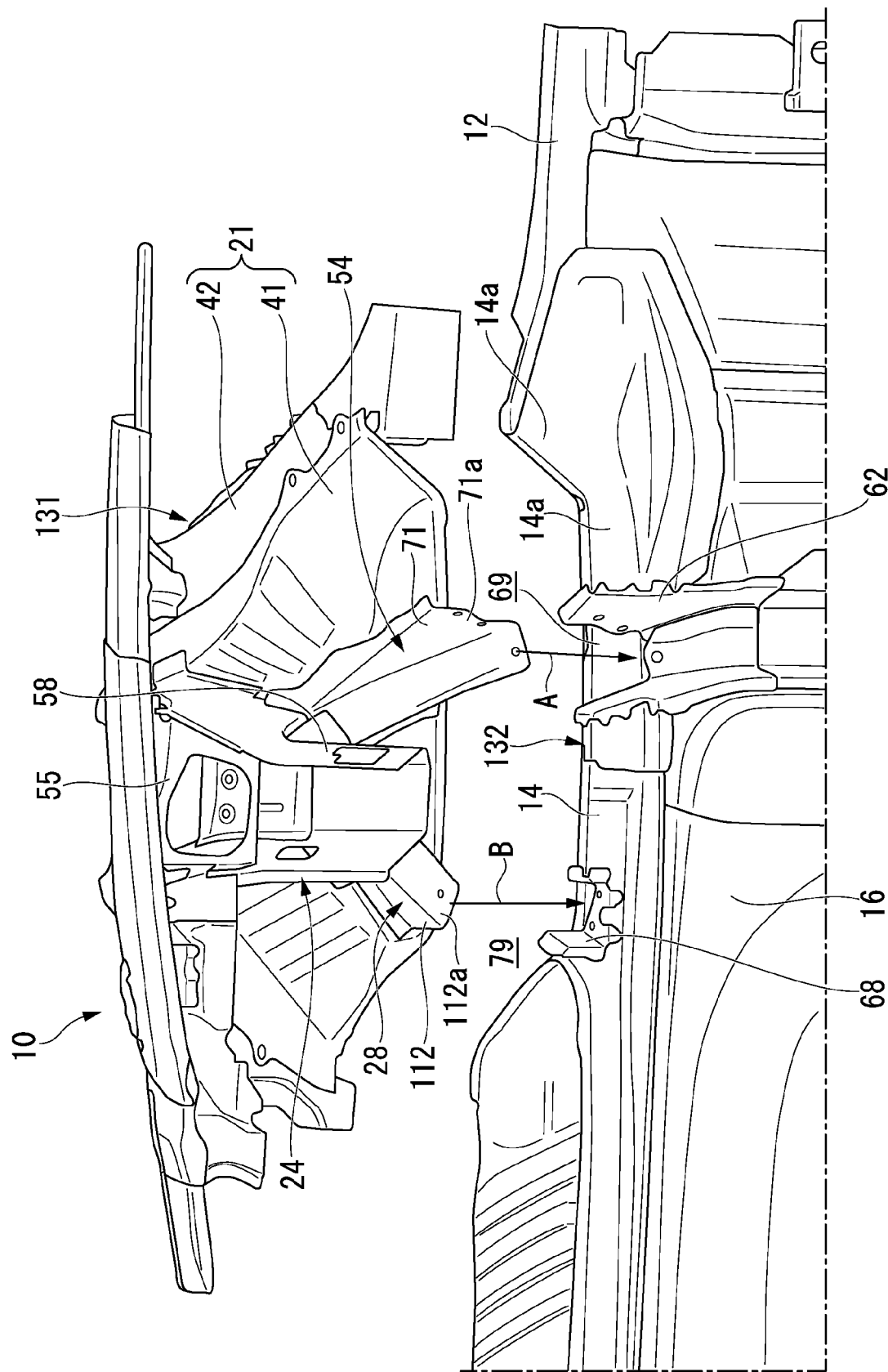
FIG. 8 is a plan view explaining a process of assembling a first component and a second component of the vehicle body structure according to the embodiment of the present invention.

As shown in FIG. 8, the first side closed cross section portion 54 is joined to the wheel house inner 41. Next, the left second side closed cross section portion 28 is joined to the wheel house inner 41. In a state in which the first side closed cross section portion 54 and the left second side closed cross section portion 28 are joined to the wheel house inner 41, the left upper closed cross section portion 55 is joined to the upper end portion of the wheel house inner 41.

Therefore, a first component (a component) 131 in which the wheel house inner 41, the first side closed cross section portion 54, the left second side closed cross section portion 28, and the like are integrated in advance is formed.

On the other hand, the left first mounting portion 62 is joined to the rear floor panel 16 and the front portion 14a of the left rear side frame 14. Next, the left second mounting portion 68 is joined to the left rear side frame 14 on the rear side of vehicle body with respect to the left first mounting portion 62 with a gap therebetween.

Therefore, a second component (a component) 132 in which the rear floor panel 16, the left rear side frame 14, the left first mounting portion 62, the left second mounting portion 68, and the like are integrated in advance is formed.

In this state, the first side closed cross section portion 54 of the first component 131 is disposed at the inner side 69 of the left first mounting portion 62 of the second component 132 as indicated by an arrow A. At the same time, the left second side closed cross section portion 28 of the first component 131 is disposed in the inner side 79 of the left second mounting portion 68 of the second component 132 as indicated by an arrow B.

As shown in FIG. 5, the base portion 112a of the second side leg portion 112 of the left second side closed cross section portion 28 is disposed at the inner side 79 of the left second mounting portion 68. In this state, the second leg side wall 115 of the second side leg portion 112 is bonded to the second mounting side wall 105 of the left second mounting portion 68 with the adhesive 84. Further, the second leg rear wall 117 of the second side leg portion 112 is bonded to the second mounting rear wall 107 of the left second mounting portion 68 with the adhesive 84.

Furthermore, the left second mounting portion 68 is joined to the wheel house inner 41. Thus, the base portion 112a of the second side leg portion 112 is mounted on the left second mounting portion 68.

Next, the base portion 71a of the first side leg portion 71 is disposed at the inner side 69 of the left first mounting portion 62. In this state, the first leg front wall 75 of the first side leg portion 71 is fastened to the first mounting front wall 66 of the left first mounting portion 62 with the bolt 82 and the nut 81. Further, the first leg rear wall 76 of the first side leg portion 71 is bonded to the first mounting rear wall 67 of the left first mounting portion 62 with the adhesive 84.

Furthermore, the left first mounting portion 62 is joined to the wheel house inner 41. Thus, the base portion 71a of the first side leg portion 71 is mounted on the left first mounting portion 62.

Figure 9:
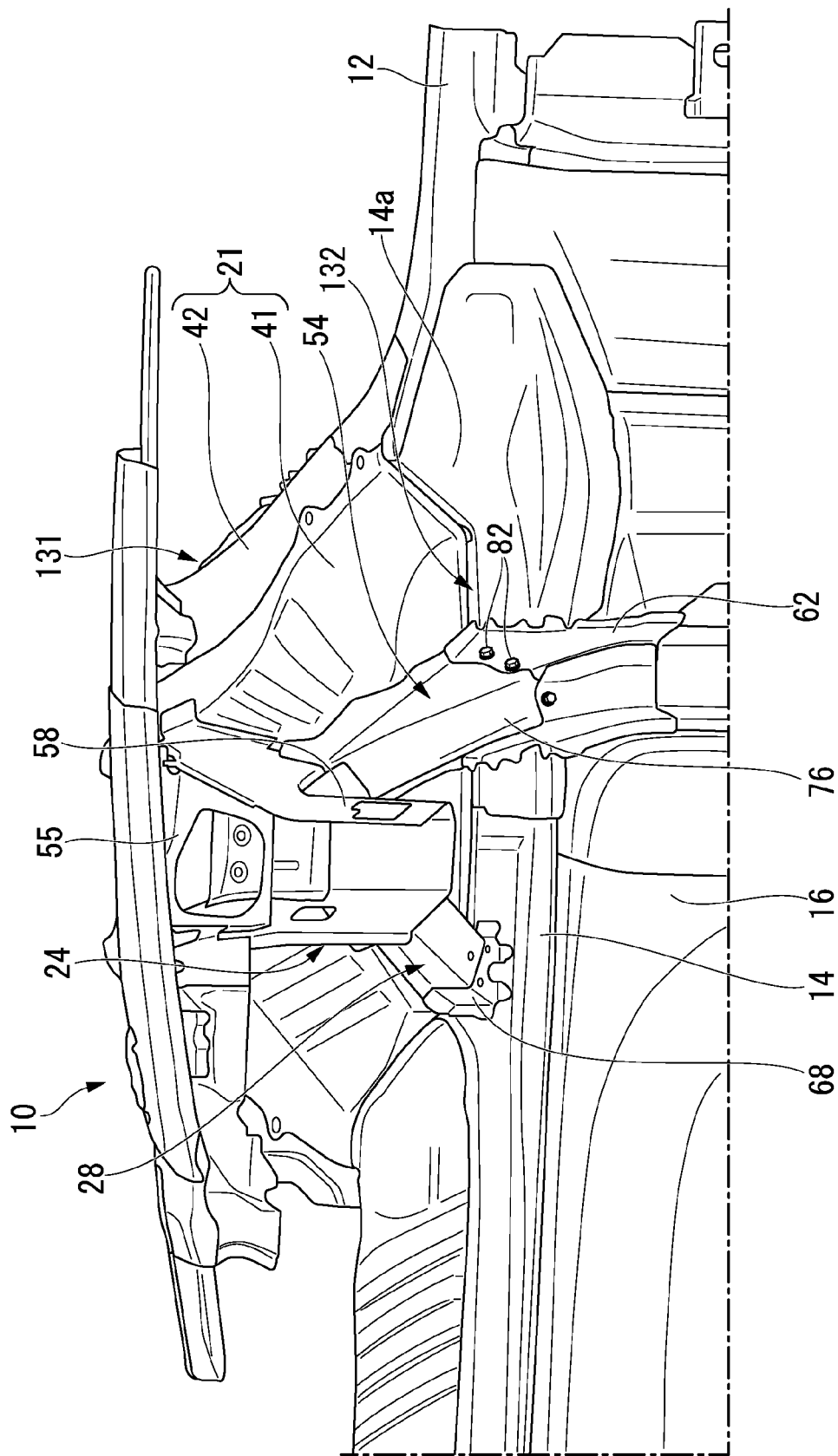
FIG. 9 is a plan view showing an assembled state between the first component and the second component of the vehicle body structure according to the embodiment of the present invention.

As shown in FIG. 9, the wheel house inner 41, the first side closed cross section portion 54, and the left second side closed cross section portion 28 are integrated in advance, and the first component 131 is formed. Further, the rear floor panel 16, the left rear side frame 14, the left first mounting portion 62, the left second mounting portion 68, and the like are integrated in advance, and the second component 132 is formed.

In this case, when the integrated first component 131 is assembled to the second component 132, it is necessary to ensure a certain clearance between the first side closed cross section portion 54 and the first mounting portion 62.

Therefore, as shown in FIG. 5, the first leg rear wall 76 of the first side closed cross section portion 54 is bonded to the first mounting rear wall 67 of the first mounting portion, and the first leg front wall 75 is fastened to the first mounting front wall 66 with the bolt 82 and the nut 81. As described above, the first leg rear wall 76 and the first mounting rear wall 67 are bonded to the first mounting portion. Thus, in a state in which a certain clearance is secured between the first side closed cross section portion 54 and the first mounting portion 62, the first side closed cross section portion 54 can be mounted on the first mounting portion 62 in a good joined state.

The technical scope of the present invention is not limited to the above-described embodiments, and various modifications can be made without departing from the spirit of the present invention.

For example, in the above-described embodiment, the example in which the first fending side wall 86 and the first fending front wall 87 are provided at the first fending portion, the first fending side wall 86 is joined to the inner side wall 45, and the fending front wall 87 is joined to the inner front wall 46 has been described, but the present invention is not limited thereto. As another example, for example, the first fending side wall 86, the first fending front wall 87, and the first fending rear wall may also be provided at the first fending portion. In this case, the first fending side wall 86 is joined to the inner side wall 45, and the first fending front wall 87 is joined to the inner front wall 46. Further, the first fending rear wall is joined to the inner rear wall 47.

Further, the first wall portion 86 and the first fending rear wall 86 may also be provided at the first fending portion. In this case, the first fending side wall 86 is joined to the inner side wall 45, and the first fending rear wall is joined to the inner rear wall 47.

Moreover, in the above-described embodiment, the example in which the closed cross-sectional area of the first fending portion 72 is reduced as compared with that of the first side leg portion 71 has been described, but the present invention is not limited thereto. As another example, for example, the closed cross-sectional area of the first fending portion 72 may be zero.

Also in this case, when the load F2 input from the left damper-mounting portion 26 to the left upper closed cross section portion 55 is input, the left upper closed cross section portion 55 and the first fending portion 72 can be relatively displaced. Therefore, a load from the damper can be fended off (absorbed) by the relative displacement between the left upper closed cross section portion 55 and the first fending portion 72.

In addition, the constituent elements in the above-described embodiment can be appropriately replaced with known constituent elements without departing from the scope of the present invention, and also each of the above-described modified examples may be appropriately combined.

INDUSTRIAL APPLICABILITY

According to the above-described vehicle body structure, application to an automobile equipped with a rear bulkhead or the like is possible.

DESCRIPTION OF THE REFERENCE SYMBOLS

Ve Vehicle
10 Vehicle body structure
16 Rear floor panel (floor)
21 Right and left wheel houses (wheel houses)
24 Rear bulkhead
26 Right and left damper-mounting portions (damper-mounting portions)
28 Left second side closed cross section portion
31 First suspension-mounting portion (suspension-mounting portion)
32 Second suspension-mounting portion
33 Rear suspension device (suspension device)
41 Wheel house inner
42 Wheel house outer
45 Inner side wall
46 Inner front wall
47 Inner rear wall
51 U-shaped cross section portion
52 Inner side of U-shaped cross section portion
54, 56 Right and left first side closed cross section portions (side closed cross section portions)
55, 57 Right and left upper closed cross section portions (upper closed cross section portions)
62, 63 Right and left first mounting portions (first mounting portions)
68 Left second mounting portion (second mounting portion)
71 First side leg portion (other portion of left first side closed cross section portion, lower portion)
72 First fending portion (fending portion, upper portion of the first side closed cross section portion)
75 First leg front wall (front wall)
76 First leg rear wall (rear wall)
91 Vehicle compartment
92 Trunk compartment
112 Second side leg portion (other portion of left second side closed cross section portion, lower portion)
113 Second fending portion (upper portion of left second side closed cross section portion)
116 Second leg front wall
117 Second leg rear wall
131 First component (component)
132 Second component (component)

The invention claimed is:
1. A vehicle body structure, comprising:
a rear bulkhead which partitions a vehicle compartment from a trunk compartment;

a wheel house inner located inside a wheel house in a vehicle width direction; and a damper-mounting portion provided outside the wheel house inner in the vehicle width direction, wherein the rear bulkhead comprises a pair of right and left side closed cross section portions that form a closed cross section which extends along the wheel house inner in a vertical direction, a pair of right and left upper closed cross section portions that form a closed cross section which extends above the side closed cross section portion in the vehicle width direction, and an upper cross member that extends in a vehicle width direction, and the side closed cross section portion comprises at least one of a fending portion of which a closed cross-sectional area is reduced compared to another region and a fending portion of which a closed cross-sectional area is zero between the upper closed cross-section portion and the damper-mounting portion.

2. The vehicle body structure according to claim 1, wherein the wheel house inner comprises a U-shaped cross section portion formed of an inner side wall which extends in a forward and rearward direction of a vehicle body, and an inner front wall and an inner rear wall which are disposed to be spaced apart from each other in the forward and rearward direction of the vehicle body and extend outward from the inner side wall in the vehicle width direction, and the side closed cross section portion comprises a closed cross section between a lower portion of the side closed cross section portion and the inner side wall and is in contact with the inner side wall and at least any one of the inner front wall and the inner rear wall at an upper portion of the side closed cross section portion.

3. The vehicle body structure according to claim 2, wherein the damper-mounting portion is provided inside the U-shaped cross section portion, and the side closed cross section portion extends to the same height as that of the damper-mounting portion in the vertical direction.

4. The vehicle body structure according to claim 3, comprising a suspension-mounting portion in which a suspension device is attached to a floor side of a vehicle, wherein the side closed cross section portion extends upward from the suspension-mounting portion.

5. The vehicle body structure according to claim 4, comprising:

a second suspension-mounting portion provided on the floor side and disposed to be spaced apart from the suspension-mounting portion in the forward and rearward direction of the vehicle body; and a second side closed cross section portion which extends upward from the second suspension-mounting portion and is connected to the damper-mounting portion.

6. The vehicle body structure according to claim 5, wherein a first mounting portion having a U-shaped cross section to which the side closed cross section portion is attached, and a second mounting portion having a U-shaped cross section to which the second side closed cross section portion is attached are provided on the floor side, a component in which the wheel house inner, the side closed cross section portion, and the second side closed cross section portion are integrated in advance is attached to a component in which the floor, the first mounting portion, and the second mounting portion are integrated in advance, and the side closed cross section portion has a front wall and a rear wall, any one of the front wall and the rear wall is bonded to the first mounting portion, and the other is fastened to the first mounting portion.

7. A vehicle body structure, comprising:

a rear bulkhead which partitions a vehicle compartment from a trunk compartment;

a wheel house inner located inside a wheel house in a vehicle width direction; and a damper-mounting portion provided outside the wheel house inner in the vehicle width direction, wherein the rear bulkhead comprises a side closed cross section portion that forms a closed cross section which extends along the wheel house inner in a vertical direction, and an upper closed cross section portion that forms a closed cross section which extends above the side closed cross section portion in the vehicle width direction, the side closed cross section portion comprises at least one of a fending portion of which a closed cross-sectional area is reduced compared to another region and a fending portion of which a closed cross-sectional area is zero between the upper closed cross-section portion and the damper-mounting portion, and the fending portion is formed by gradually reducing a cross-sectional area of the side closed cross section portion toward a vehicle upward direction.

8. The vehicle body structure according to claim 7, wherein the wheel house inner comprises a U-shaped cross section portion formed of an inner side wall which extends in a forward and rearward direction of a vehicle body, and an inner front wall and an inner rear wall which are disposed to be spaced apart from each other in the forward and rearward direction of the vehicle body and extend outward from the inner side wall in the vehicle width direction, and the side closed cross section portion comprises a closed cross section between a lower portion of the side closed cross section portion and the inner side wall and is in contact with the inner side wall and at least any one of the inner front wall and the inner rear wall at an upper portion of the side closed cross section portion.

9. The vehicle body structure according to claim 8, wherein the damper-mounting portion is provided inside the U-shaped cross section portion, and the side closed cross section portion extends to the same height as that of the damper-mounting portion in the vertical direction.

10. The vehicle body structure according to claim 9, comprising a suspension-mounting portion in which a suspension device is attached to a floor side of a vehicle, wherein the side closed cross section portion extends upward from the suspension-mounting portion.

11. The vehicle body structure according to claim 10, comprising:

a second suspension-mounting portion provided on the floor side and disposed to be spaced apart from the suspension-mounting portion in the forward and rearward direction of the vehicle body; and a second side closed cross section portion which extends upward from the second suspension-mounting portion and is connected to the damper-mounting portion.

12. The vehicle body structure according to claim 11, wherein
a first mounting portion having a U-shaped cross section to which the side closed cross section portion is attached, and a second mounting portion having a U-shaped cross section to which the second side closed cross section portion is attached are provided on the floor side,
a component in which the wheel house inner, the side closed cross section portion, and the second side closed cross section portion are integrated in advance is attached to a component in which the floor, the first mounting portion, and the second mounting portion are integrated in advance, and
the side closed cross section portion has a front wall and a rear wall, any one of the front wall and the rear wall is bonded to the first mounting portion, and the other is fastened to the first mounting portion.

* * * * *